United States Patent [19]
Gurdak et al.

[11] 4,106,375
[45] Aug. 15, 1978

[54] VARIABLE FEED HIGH-PRODUCTION PRECISION MACHINE

[75] Inventors: Felix J. Gurdak, Winsted; Francis W. Cook, Jr., Newington, both of Conn.

[73] Assignee: Litton Industrial Products, Inc., New Britain, Conn.

[21] Appl. No.: 569,543

[22] Filed: Apr. 18, 1975

[51] Int. Cl.$^2$ ............................................. B23B 3/32
[52] U.S. Cl. ...................................... 82/21 B; 90/20
[58] Field of Search ................. 90/15 R, 20; 82/2 B, 82/21 B, 19; 318/163, 164; 408/3

[56] References Cited

U.S. PATENT DOCUMENTS

| | | | |
|---|---|---|---|
| 1,389,433 | 8/1921 | Brophy | 318/164 X |
| 3,232,143 | 2/1966 | Schurger et al | 408/16 |
| 3,548,172 | 12/1970 | Centwer et al. | 408/3 X |
| 3,720,475 | 3/1973 | Leacock | 408/129 X |
| 3,895,559 | 7/1975 | Hoffman | 408/129 X |

*Primary Examiner*—Z. R. Bilinsky
*Attorney, Agent, or Firm*—Joseph R. Spalla

[57] ABSTRACT

A high-production, precision machine tool has means for varying the feed rate of the tool during the actual machining of each workpiece. The means comprise a plurality of program cams disposed on the camshaft of the machine tool for selecting the appropriate feed rate at the desired time during the machining operation. The camshaft is rotated by a permanent magnet D.C. motor, and as the camshaft rotates, the program cams, in turn, trip a plurality of switches to gate one of several predetermined voltage signals representative of the desired motor speeds to a comparator which compares the gated signal with the output of a tachometer measuring the actual motor speed. The difference, a voltage signal representative of the correction to be made to the motor, is applied to a silicon controlled rectifier firing circuit which selectively fires an SCR network, generating a shaped pulse to provide a controlled voltage input to the motor, thereby selectively controlling its speed.

6 Claims, 3 Drawing Figures

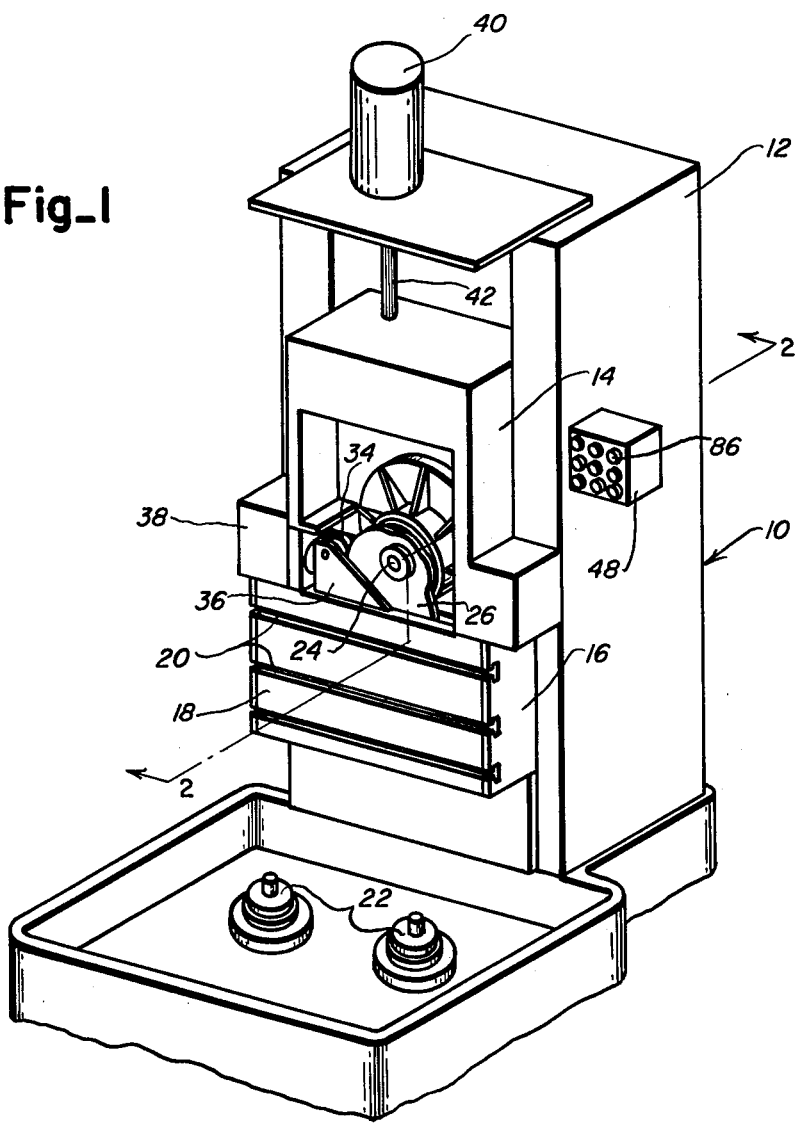
Fig_1
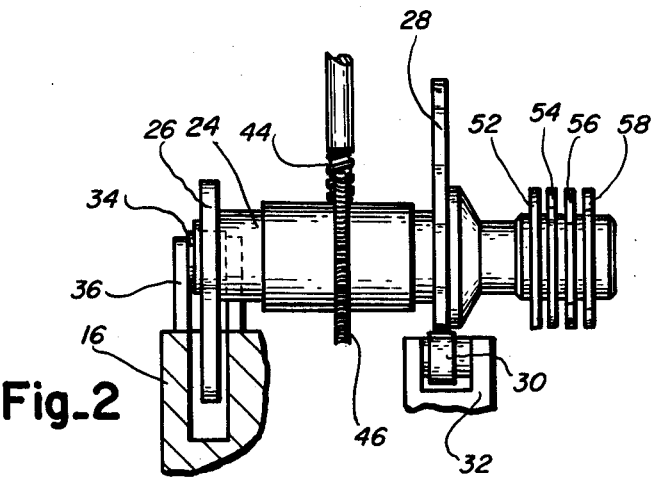
Fig_2

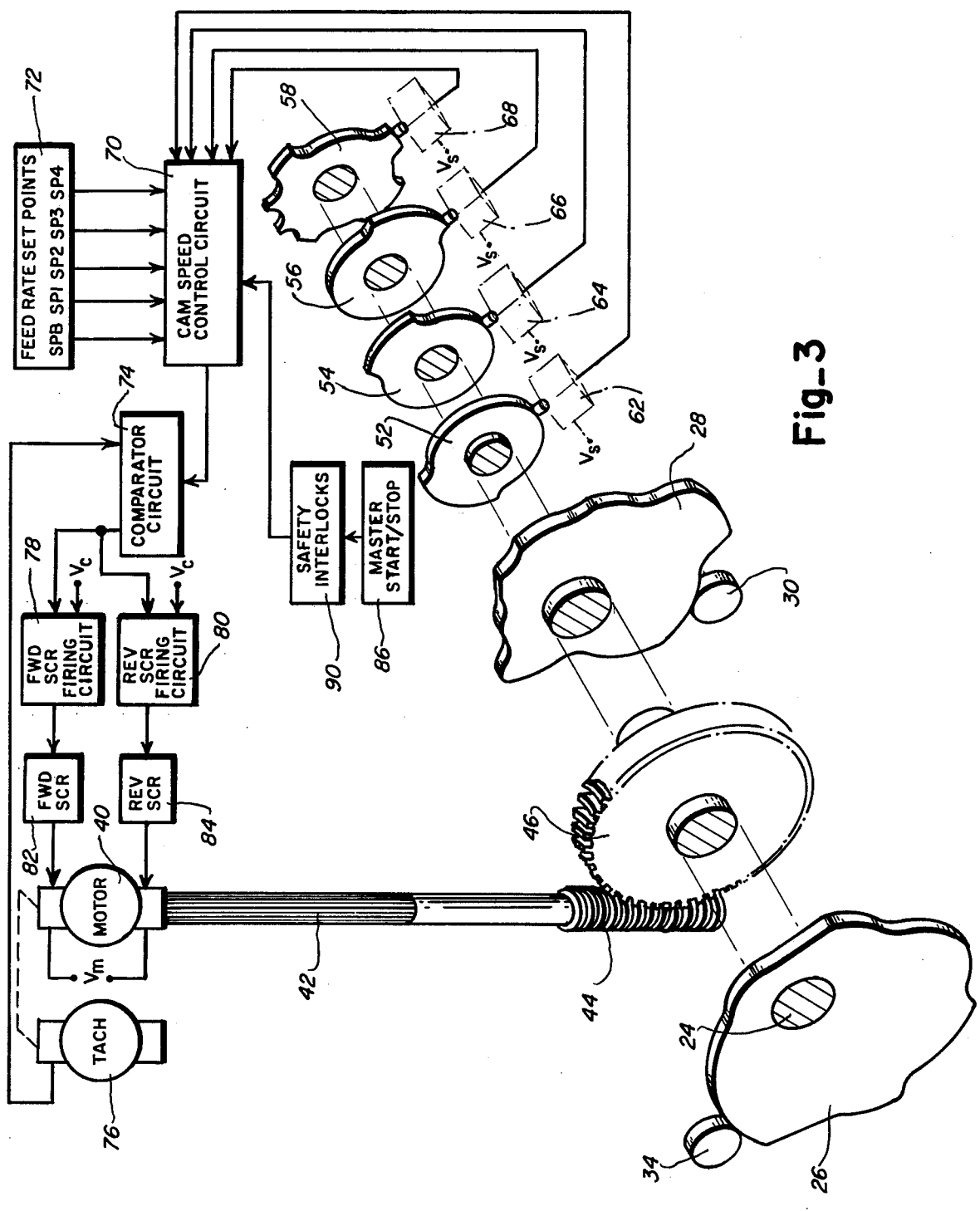
Fig._3

VARIABLE FEED HIGH-PRODUCTION PRECISION MACHINE

BACKGROUND

This invention relates to machine tools which manufacture large quantities of precision parts and more particularly to those which employ perpendicularly mounted slides to feed the tool in the vertical and horizontal directions. In this type of machine, the tool is fed along a path described by predetermined vertical and horizontal movements of the slides to cut the desired precision surface in a workpiece.

In the past, high-production, precision machine tools used an AC motor in combination with a series of belts and pulleys to drive the tool. The motor output drove a shaft having two cams disposed thereon, one controlling the vertical component of the tool path, and one the horizontal. Since the drive was capable of operating the vertical and horizontal cams at only one speed during the actual machining operation, the cams could be rotated at only one speed. Since tool feed rate depends on the rotational speed of the cams and on the slope of the cams, for any given cam the tool could be fed at only one speed.

Feeding the tool at only one speed had several disadvantages. Primarily, production time was lost since the tool had to be fed at the slowest rate which was permitted by the design of the finished part. For example, machining microfinished surfaces, sharp contours or high tolerances requires slower feed rates than machining unfinished surfaces, gradual contours or ordinary tolerances. Thus, a part which had only a single sharp contour with many gentle contours or a single microfinished surface with many non-precision surfaces could be machined only at the slower feed rate permitted by the sharply contoured or microfinished surface, if the machine tool was equipped with only a single feed rate.

Additionally, feed rates could not be adjusted to compensate for excessive tool wear. During some portions of the machining cycle, such as machining a hardened portion of the workpiece or machining a sharp contour, the tool wore at a greater rate than at other portions of the cycle. The faster tools wear out, the more production time is lost replacing worn tools.

By following the present invention, however, the machine tool is able to vary the feed rate during the actual machining operation. Since sharply contoured surfaces or microfinished surfaces can be cut at a slower rate and the gently contoured surfaces or non-precision surfaces can be cut at a faster rate, the part can be made in a minimum amount of time. Additionally, tool wear and machine down-time can be decreased. Thus, a machine tool equipped with a plurality of tool feed rates decreases the production time of each machined part, and increases production rates.

Furthermore, not only are production rates increased by the present invention, but parts are machined with more precise tolerances and microfinishes, with better chip control, i.e. stock removal, and the cam designer is given more flexibility so that a better quality machine part may be produced more efficiently. Thus, a high-production, precision machine tool which is capable of feeding the tool at various rates during each cycle is of major benefit in the machine tool art.

DEFINITION

When the term "high-production, precision machine tool" is used in the specification and appended claims, the term is applied to those machine tools which are designed for a high rate of production of a large number of precision products. For example, such machine tools are used to manufacture precision parts for the automotive industry. When the term is used, it is meant to thereby exclude so-called "numerically controlled" machine tools, that is, those machines which are controlled by a programmed tape or programmed set of instructions by which the tool path is digitally represented in numeric form and which is then translated into instructions to drive the tool along the tool path.

SUMMARY OF THE INVENTION

A high-production, precision machine tool has means for varying the feed rate of the tool during the actual machining of each workpiece. The means comprise a plurality of program cams disposed on the camshaft of the machine tool for selecting the appropriate feed rate at the desired time during the machining operation. The camshaft is rotated by a permanent magnet D.C. motor, and as the camshaft rotates, the program cams, in turn, trip a plurality of switches to gate one of several predetermined voltage signals representative of the desired motor speeds to a comparator which compares the gated signal with the output of a tachometer measuring the actual motor speed. The difference, a voltage signal representative of the correction to be made to the motor, is applied to a silicon controlled rectifier firing circuit which selectively fires an SCR network, generating a shaped pulse to provide a controlled voltage input to the motor, thereby selectively controlling its speed.

OBJECTS OF THE INVENTION

An object of the invention is to reduce the production time of parts manufactured on a high-production, precision machine tool by providing the machine tool with the capability of varying the tool feed.

Another object of the invention is to increase the tool life of the tool in a high-production, precision machine tool.

Yet another object of the invention is to produce parts on a high-production, precision machine tool with tighter tolerances, a finer microfinish and to facilitate chip removal in the machine.

Still another object of the invention is to provide the cam designer of a high-production, precision machine tool with the flexibility in designing machines which will produce higher quality parts more efficiently.

Other objects and many attendant advantages of the present invention will become apparent to those skilled in the art from a reading of the following detailed description taken in conjunction with the accompanying drawing.

BRIEF DESCRIPTION OF THE DRAWING

FIG. 1 is a perspective view of a vertical precision contour boring and turning machine made in accordance with the invention;

FIG. 2 is a sectional view taken along lines 2—2 of FIG. 1 showing the camshaft, vertical and horizontal motion cams, the worm gear for driving the camshaft and program cams for varying the feed rate of the vertical and horizontal slide; and FIG. 3 is an exploded perspective view of the camshaft, showing motion cams, program cams and followers, together with a schematic diagram of the motor and electrical control circuit by which the tool feed rate is varied.

DETAILED DESCRIPTION OF THE INVENTION

A vertical precision contour boring and turning machine tool is illustrated in FIG. 1, generally designated by reference numeral 10. The machine tool 10 comprises a body 12 which carries a vertical slide 14 which in turn carries a horizontal slide 16. Face 18 of horizontal slide 16 is provided with channels 20 for the receipt of one or more tool holders and one or more tools (not shown). In general, two or more tool holders receiving two or more tools are provided on the slide for production machines, the exact number depending on the design requirements of the part to be machined. For simplicity, however, the invention is described herein as applied to only a single tool carried by the slide 16. Spindles 22 are each provided with chucks (not shown) for the receipt of the workpieces to be machined.

Mounted on vertical slide 14 is a horizontally disposed camshaft 24. Horizontal cam 26 and vertical cam 28 (FIGS. 2, 3) are mounted on and fixed with respect to camshaft 24. Vertical cam 28 rests by gravity on vertical rest 30, which, by means of bracket 32, is fixed to body 12 of machine tool 10.

Horizontal follower 34, which is fixed to horizontal slide 16 by arm 36 is maintained in constant contact with horizontal cam 26 by a pneumatic cylinder (not shown) which maintains a constant opposing force against cam 36. The pneumatic cylinder is housed in extension 38 of slide 14.

Motor 40 is mounted on body 12 of the machine tool above camshaft 24. The output of motor 40 drives a vertically disposed splined shaft 42, which terminates in a worm-screw threaded portion 44. Shaft 42 engages motor 40 by means of a splined connection which permits vertical movement of the shaft while being rotated by the motor. Worm-screw threaded portion 44 of shaft 42 engages a meshing worm gear 46 which is also mounted on camshaft 24 to drive the camshaft.

A control panel 48 mounted on body 12 houses controls for the operation of machine tool 10.

When motor 40 is actuated by starting master switch 86 and by closing safety interlocks 90 (FIG. 3), the motor rotates splined shaft 42 which rotates the worm-screw threaded portion 44 of the shaft and turns worm gear 46. As worm gear 46 turns, camshaft 24 is rotated, also rotating horizontal cam 26 and vertical cam 28. As vertical cam 28 is rotated to present a different surface to fixed vertical rest 30, vertical cam 28 will rise or fall in response to the profile. As cam 28 rises or falls, it carries camshaft 24 and vertical slide 14 with it, together with horizontal slide 16 and a tool holder which has been attached to face 18 of the horizontal slide. Thus, a precision vertical component is imparted to a tool which is carried by machine tool 10.

At the same time, horizontal cam 26 is also rotated by camshaft 24. As horizontal cam 26 is rotated, horizontal follower 34 moves horizontally in response to the profile of cam 26, under the force of the opposing pneumatic cylinder housed in extension 38, moving horizontal slide 16 in a horizontal direction. Thus, a precision horizontal component is imparted to a tool which is carried by slide 16. When the camshaft 24 undergoes one complete revolution, the desired precision path of the tool will be completed and one complete machining operation will have been performed on the workpiece, returning slides 14 and 16 to their home position. The vertical slide 14 and the supported horizontal slide 16 are then moved upwardly, allowing removal of the workpiece from a spindle 22, by means which are not shown and which form no part of the present invention. A new workpiece is then fixed to a spindle, and when the vertical slide and the supported horizontal slide are lowered to bring the cutting tool into cutting position, a new machining cycle may begin.

Also fixed to camshaft 24 are four program cams 52, 54, 56, 58, as seen in FIGS. 2, 3, which permit the feed rate of the tool to be varied during each machining cycle. Switches 62, 64, 66, 68 are fixed with respect to camshaft 24 facing program cams 52–58 respectively, and disposed so that they are selectively actuated over predetermined intervals during the machining cycle by the program cams, depending on the cam profiles. As switches 62–68 are selectively actuated, the generated signals are applied to a control circuit 70 (FIG. 3) to gate one of five predetermined voltages set into and maintained by set points SPB, SP1, SP2, SP3, SP4. Set points SPB and SP1, SP2, SP3, SP4 may be a plurality of potentiometers, and the predetermined voltages supplied thereby may be varied at the start of each machining cycle to provide any desired combination of five predetermined speeds. The set voltages correspond to five predetermined rates at which the tool may be fed along its machining path. One of the predetermined feed rates is the base or high-speed feed rate. When none of the switches 62–68 have been actuated by their respective cams 52–58, control circuit 70 will gate the predetermined voltage set at set point SPB, producing the base feed rate. When the first switch 62 is actuated by the protruding surface of program cam 52, control circuit 70 will gate the voltage set at set point SP1, to produce a different feed rate. Similarly, switches 64, 66 or 68, when actuated by their respective program cams 54, 56 or 58 will each send an appropriate timing signal to control circuit 70 which will then gate the predetermined voltages maintained at set points SP2, SP3 or SP4 respectively, at the desired point in the program cycle. Thus, voltages representing five feed rates may be supplied using only four program cams.

The predetermined voltage which is transmitted by control circuit 70 is applied to a comparator circuit 74, which compares a voltage signal representative of the actual speed of the motor 40 with a voltage signal representative of the desired motor speed, as determined by set voltages SPB, SP1, SP2, SP3 and SP4. The speed of motor 40 is measured by an integral tachometer 76 which produces a representative output voltage, which is applied to comparator circuit 74.

The output of comparator circuit 74, an error signal which represents the difference between the desired and actual speed of motor 40, is next applied to a pair of SCR (silicon controlled rectifier) firing circuits 78, 80. Depending on the polarity of the output of circuit 74, either forward SCR firing circuit 78 or reverse SCR firing circuit 80 will transmit a pulse to a forward SCR network 82 or a reverse SCR network 84 to rotate motor 40 either in the forward or clockwise direction or in the reverse or counterclockwise direction, respectively. The voltage level of the output of the tachometer compensation circuit, when applied to SCR firing circuits 78, 80 and then to SCR networks 82 or 84, determines the shape and timing of the pulse which is applied to motor 40 by either forward or reverse SCR network 82 or 84. Thus, circuit 74 determines the speed at which the motor rotates, as further described below.

D.C. motor 40 is of the permanent magnet type. While in other D.C. motors it is necessary to control the field voltage, the permanent magnet D.C. motor has a stationary magnetic field in which an armature is free to rotate. The armature consists of a series of coils which are connected externally to the motor through a commutator and brushes. One property of this type of motor is that speed of the motor, which may vary continuously from zero to a maximum speed which may be, for example, 1,000 rpm or 3,000 rpm, is substantially proportional to the voltage across the armature terminals of the motor where mechanical load on the motor is constant. Thus, the speed of the motor and thus, as applied to a machine tool, the rotational speed of the camshaft and the speed of the machining, is proportional to the input voltage to the motor. To control the input voltage to the motor, an SCR firing circuit is utilized to advance the firing angle of an SCR network to generate a shaped pulse. The shape of the pulse which is thus applied by the SCR to the motor increases the speed of the motor for a given torque. By firing a second SCR network, applied to the opposite terminals of the motor, reverse current is applied to the motor, thereby decreasing its speed.

The foregoing description of the invention, as shown by the drawing, has been made in connection with a two-spindle vertical boring and turning machine. The invention may also be used on other types of high-production, precision machine tools, such as on single-spindle or other multiple-spindle machines. Additionally, the invention may be used in connection with a horizontal machine, that is, where the camshaft is carried by and moves with the horizontal slide. The invention has been described for illustrative purposes using four program cams. It is to be understood that any number of program cams may be used consistently with the scope of the invention.

What is claimed is:

1. In a machine tool having movable slides for moving a slide mounted tool holder through a tool path relative to a rotating workpiece to machine said workpiece to a desired form, means to drive said slides comprising rotatable slide driving cams having profiles defining said tool path coordinates whereby in each revolution of said cams said workpiece will be machined to said desired form, said workpiece form having portions that cam be machined at faster rates than other portions, a variable speed motor for rotating said driving cams at a plurality of speeds providing optimum feed rates for each portion of the workpiece form to be machined in each revolution of said cams, means for establishing voltages corresponding to speeds providing optimum machining rates for each portion of said workpiece, and means for applying said voltages to vary the speed of said motor in each revolution of said driving cams thereby to vary the feed rate of said tool holder according to the portion of the workpiece form being machined.

2. In a contour boring and turning machine tool having a horizontal slide and an associated vertical slide, one of said slides being adapted to support a tool, and means for moving said slides to move a supported tool through a tool path thereby to machine a rotating workpiece to a desired shape, said means including a camshaft, a horizontal cam on said camshaft for moving said horizontal slide, a vertical cam disposed on the camshaft for moving said vertical slide, said horizontal cam and said vertical cam each having a plurality of sectors of predetermined profile which together define said tool path coordinates in each revolution of said camshaft, the improvement comprising voltage responsive motor means for rotating said camshaft at predetermined speeds related to discrete cam sector profiles thereby to vary the feed rate of a slide supported tool as it traverses said tool path as will allow optimum machining rates for each workpiece contour, means for establishing a number of voltages whose magnitudes are representative of said predetermined speeds, and means operative over intervals of a camshaft revolution corresponding to cam sector intervals for gating different ones of said established voltages to said motor means to control its speed.

3. In a machine tool as recited in claim 2, said means for gating established voltages comprising a plurality of timing cams mounted on said camshaft, a plurality of switches positioned for closure by associated timing cams, and means operative to gate said established voltages to said motor means over the interval of closure of associated switches.

4. In a machine tool as recited in claim 2, said means for establishing a number of voltages comprising operator settable controls.

5. In a machine as recited in claim 2, said motor means comprising a permanent magnet D.C. motor.

6. In a machine tool as recited in claim 2 further including means for generating a voltage representing the actual speed of said motor means, means for comparing the voltage representing the actual motor speed and an established voltage gated to said motor means, and means for applying the difference voltage to said motor means to hold the speed of said motor means at the speed represented by the gated established voltage.

* * * * *